United States Patent
Macleod et al.

(10) Patent No.: US 12,432,260 B1
(45) Date of Patent: Sep. 30, 2025

(54) MAINTENANCE AND ADJUSTMENT OF ENCRYPTED TRAFFIC BY EXTRACTING ANCHORS OF TRUST

(71) Applicant: Packet Forensics, LLC, Virginia Beach, VA (US)

(72) Inventors: Ian Macleod, Broomfield, CO (US); Donald McCarthy, Kingsport, TN (US); Victor Oppleman, Virginia Beach, VA (US)

(73) Assignee: PACKET FORENSICS, LLC, Virginia Beach, VA (US)

( * ) Notice: Subject to any disclaimer, the term of this patent is extended or adjusted under 35 U.S.C. 154(b) by 0 days.

(21) Appl. No.: 19/191,580

(22) Filed: Apr. 28, 2025

(51) Int. Cl.
 *G06F 7/04* (2006.01)
 *H04L 9/40* (2022.01)

(52) U.S. Cl.
 CPC ........ *H04L 63/306* (2013.01); *H04L 63/0442* (2013.01); *H04L 63/0876* (2013.01); *H04L 63/145* (2013.01)

(58) Field of Classification Search
 CPC ............... H04L 63/306; H04L 63/0442; H04L 63/0876; H04L 63/145; H04L 9/0819; H04L 9/0825; H04L 9/0866
 See application file for complete search history.

(56) References Cited

U.S. PATENT DOCUMENTS

| | | | | |
|---|---|---|---|---|
| 11,381,578 B1* | 7/2022 | Manni | .................... | G06F 21/567 |
| 11,687,652 B1* | 6/2023 | Pinheiro | ............... | G06F 21/564 726/23 |
| 2020/0097656 A1* | 3/2020 | Burke | .................... | G06F 21/565 |
| 2023/0281308 A1* | 9/2023 | Maimon | ............... | G06F 21/563 726/25 |
| 2023/0342466 A1* | 10/2023 | Briliauskas | ............... | G06F 8/52 |

OTHER PUBLICATIONS

Papa et al, Placement of Trust Anchors in Embedded Computer Systems, Jun. 6, 2011, IEEE, pp. 111-116. (Year: 2011).*
Junkai et al, An Approach for Sensitive Binary File Protection, May 17, 2009, IEEE, pp. 716-718. (Year: 2009).*

* cited by examiner

*Primary Examiner* — Philip J Chea
*Assistant Examiner* — Jenise E Jackson
(74) *Attorney, Agent, or Firm* — MH2 Technology Law Group, LLP (57) ABSTRACT

Techniques for inspecting encrypted network communications are presented. The techniques include: intercepting a binary file sent from a resource server to a host computer, where the binary file is configured to facilitate communications between the host computer and a remote server computer; identifying a trust anchor, where the trust anchor is configured to authenticate the remote server computer; replacing the trust anchor in the binary file with a replacement trust anchor, to produce an altered binary file; storing the trust anchor in association with the replacement trust anchor, an identifier of the binary file, and an identifier of the host computer; and passing the altered binary file to the host computer, where the host computer receives the altered binary file instead of the binary file, and where the replacement trust anchor is usable by the host computer to authenticate information in a communication sent by the remote server computer.

20 Claims, 2 Drawing Sheets

MAINTENANCE AND ADJUSTMENT OF ENCRYPTED TRAFFIC BY EXTRACTING ANCHORS OF TRUST

FIELD

This disclosure relates generally to computer network communications in general and computer security in particular.

BACKGROUND

Large networks, such as corporate enterprise networks, may utilize break-and-inspect computer security systems to intercept and inspect encrypted network traffic for various purposes, including cybersecurity, data loss prevention, etc. Such network traffic may be encrypted using transport layer security, e.g., HTTPS. However, existing break-and-inspect computer security systems require that host computers have pre-deployed digital certificates that are manually installed via local group policies or other local information technology management processes. Thus, some prior art systems can only break and inspect encrypted network traffic that is generated based on such locally pre-installed digital certificates.

SUMMARY

According to various embodiments, a method of inspecting encrypted network communications is presented. The method includes: intercepting, by a packet processing computer, a binary file sent from a resource server to a host computer, where the binary file is configured to facilitate communications between the host computer and a remote server computer; identifying, by the packet processing computer, a trust anchor in a binary stream that contains the binary file, where the trust anchor is configured to authenticate the remote server computer; replacing, by the packet processing computer, the trust anchor in the binary file with a replacement trust anchor, whereby an altered binary file is produced; storing the trust anchor in association with the replacement trust anchor, an identifier of the binary file, and an identifier of the host computer, where the storing is at a storage location that is communicatively accessible by the packet processing computer; and passing, by the packet processing computer, the altered binary file to the host computer, where the altered binary file is received by the host computer instead of the binary file, and where the replacement trust anchor is usable by the host computer to authenticate information in a communication sent by the remote server computer.

Various optional features of the above method embodiments include the following. The binary file may include malware, and the binary file may be requested from the resource server by the host computer after the host computer is compromised. The packet processing computer may be on a network path between the host computer and the resource server. The trust anchor may be at one end of a cryptographic trust chain, where another end of the cryptographic trust chain includes a public key of the remote server computer in an asymmetric cryptographic scheme. The identifying may include identifying based on a prior analysis of an instance of the binary file. The identifying may include identifying a container data structure for the trust anchor. The method may include: intercepting, by a second packet processing computer, a communication from the remote server computer to the host computer, where the communication includes a digital signature that is configured to be authenticated using the trust anchor; replacing, by the second packet processing computer, the digital signature by a replacement digital signature, whereby an altered communication is produced, where the replacement digital signature is configured to be authenticated by the replacement trust anchor; and passing, by the second packet processing computer, the altered communication to the host computer, where the altered communication is received by the host computer instead of the communication, and where the replacement trust anchor is usable by the host computer to authenticate the replacement digital signature. The method may include: establishing, by a second packet processing computer, a first encrypted communication channel with the remote server computer using the trust anchor; establishing, by the second packet processing computer, a second encrypted communication channel with the host computer using the replacement trust anchor; and transferring, by the second packet processing computer, a communication between the remote server computer and the host computer through the first encrypted communication channel and through the second encrypted communication channel. The communication may include encrypted information, and the method may further include decrypting, by the second packet processing computer, the encrypted information. The establishing the first encrypted communication channel may include establishing a first cryptographic symmetric key, where the first cryptographic symmetric key is shared between the second packet processing computer and the remote server computer using the trust anchor, and the establishing the second encrypted communication channel may include establishing a second cryptographic symmetric key, where the second cryptographic symmetric key is shared between the second packet processing computer and the host computer using the replacement trust anchor.

According to various embodiments, a system for inspecting encrypted network communications is presented. The system includes: a non-transitory computer readable medium including instructions; and at least one electronic processor that executes the instructions to perform operations including: intercepting, by a packet processing computer, a binary file sent from a resource server to a host computer, where the binary file is configured to facilitate communications between the host computer and a remote server computer; identifying, by the packet processing computer, a trust anchor in a binary stream that contains the binary file, where the trust anchor is configured to authenticate the remote server computer; replacing, by the packet processing computer, the trust anchor in the binary file with a replacement trust anchor, whereby an altered binary file is produced; storing the trust anchor in association with the replacement trust anchor, an identifier of the binary file, and an identifier of the host computer, where the storing is at a storage location that is communicatively accessible by the packet processing computer; and passing, by the packet processing computer, the altered binary file to the host computer, where the altered binary file is received by the host computer instead of the binary file, and where the replacement trust anchor is usable by the host computer to authenticate information in a communication sent by the remote server computer.

Various optional features of the above system embodiments include the following. The binary file may include malware, and the binary file may be requested from the resource server by the host computer after the host computer is compromised. The packet processing computer may be on a network path between the host computer and the resource server. The trust anchor may be at one end of a cryptographic trust chain, where another end of the cryptographic trust chain includes a public key of the remote server computer in an asymmetric cryptographic scheme. The identifying may include identifying based on a prior analysis of an instance of the binary file. The identifying may include identifying a container data structure for the trust anchor. The operations may further include: intercepting, by a second packet processing computer, a communication from the remote server computer to the host computer, where the communication includes a digital signature that is configured to be authenticated using the trust anchor; replacing, by the second packet processing computer, the digital signature by a replacement digital signature, whereby an altered communication is produced, where the replacement digital signature is configured to be authenticated by the replacement trust anchor; and passing, by the second packet processing computer, the altered communication to the host computer, where the altered communication is received by the host computer instead of the communication, and where the replacement trust anchor is usable by the host computer to authenticate the replacement digital signature. The operations may further include: establishing, by a second packet processing computer, a first encrypted communication channel with the remote server computer using the trust anchor; establishing, by the second packet processing computer, a second encrypted communication channel with the host computer using the replacement trust anchor; and transferring, by the second packet processing computer, a communication between the remote server computer and the host computer through the first encrypted communication channel and through the second encrypted communication channel. The communication may include encrypted information, and the operations may further include decrypting, by the second packet processing computer, the encrypted information. The establishing the first encrypted communication channel may include establishing a first cryptographic symmetric key, where the first cryptographic symmetric key is shared between the second packet processing computer and the remote server computer using the trust anchor, and where the establishing the second encrypted communication channel includes establishing a second cryptographic symmetric key, where the second cryptographic symmetric key is shared between the second packet processing computer and the host computer using the replacement trust anchor.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the examples can be more fully appreciated, as the same become better understood with reference to the following detailed description of the examples when considered in connection with the accompanying figures, in which.

DESCRIPTION OF THE EXAMPLES

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention and it is to be understood that other examples may be utilized and that changes may be made without departing from the scope of the invention. The following description is, therefore, merely exemplary.

Various embodiments provide techniques and devices to break and inspect encrypted network traffic, where the network traffic is encrypted using a trust anchor that is transmitted in-line over the internet. Some embodiments solve the problem of prior art break-and-inspect techniques and devices that require usage of pre-installed host-based digital certificates or other a priori techniques, such as out-of-band keys and physical installation, for provisioning trust anchors. Instead, some embodiments intercept a trust anchor that is sent to a host computer in, or in association with, an executable file, such as a malicious or suspected malicious payload, e.g., a malware exploit. In general, legitimate actors may not transmit trust anchors, but rather participate in standard Public Key Infrastructure (PKI) schemes in which trust anchors are not transmitted. Thus, some embodiments may be used to break and inspect network traffic sent or controlled by nefarious actors who do not participate in known legitimate PKI schemes. Non-limiting examples of trust anchors that are compatible with various embodiments described herein include digital certificates, public keys of asymmetric cryptographic schemes, and keying material, from which various cryptographic keys, such as symmetric cryptographic keys, may be derived. Embodiments may be implemented where the executable code (e.g., malicious software that is implanted on a targeted host system) uses the trust anchor as a basis for communications with a malicious, suspect, or untrusted remote server computer (e.g., to encrypt, authenticate, or trust the communications), where the communications may command and/or control the executable code's execution, for example. Embodiments may use one or more packet processing computers or other devices that identify the binary network traffic of interest, which, e.g., includes the executable file and the trust anchor, and manipulate that traffic in transit. According to some embodiments, the packet processing computer(s) copy and replace the trust anchor, storing the original copy and replacement trust anchors in a distributed database for use in proxy sessions, e.g., during initial trust establishment and/or encryption establishment communications. According to some embodiments, the packet processing computer(s) can then intercept and decrypt communications from both the operational executable file (e.g., malicious or untrusted software, such as malware) installed in the host computer and the remote server computer that controls it.

These and other features and advantages and shown and described herein in reference to the drawings.

Figure 1:
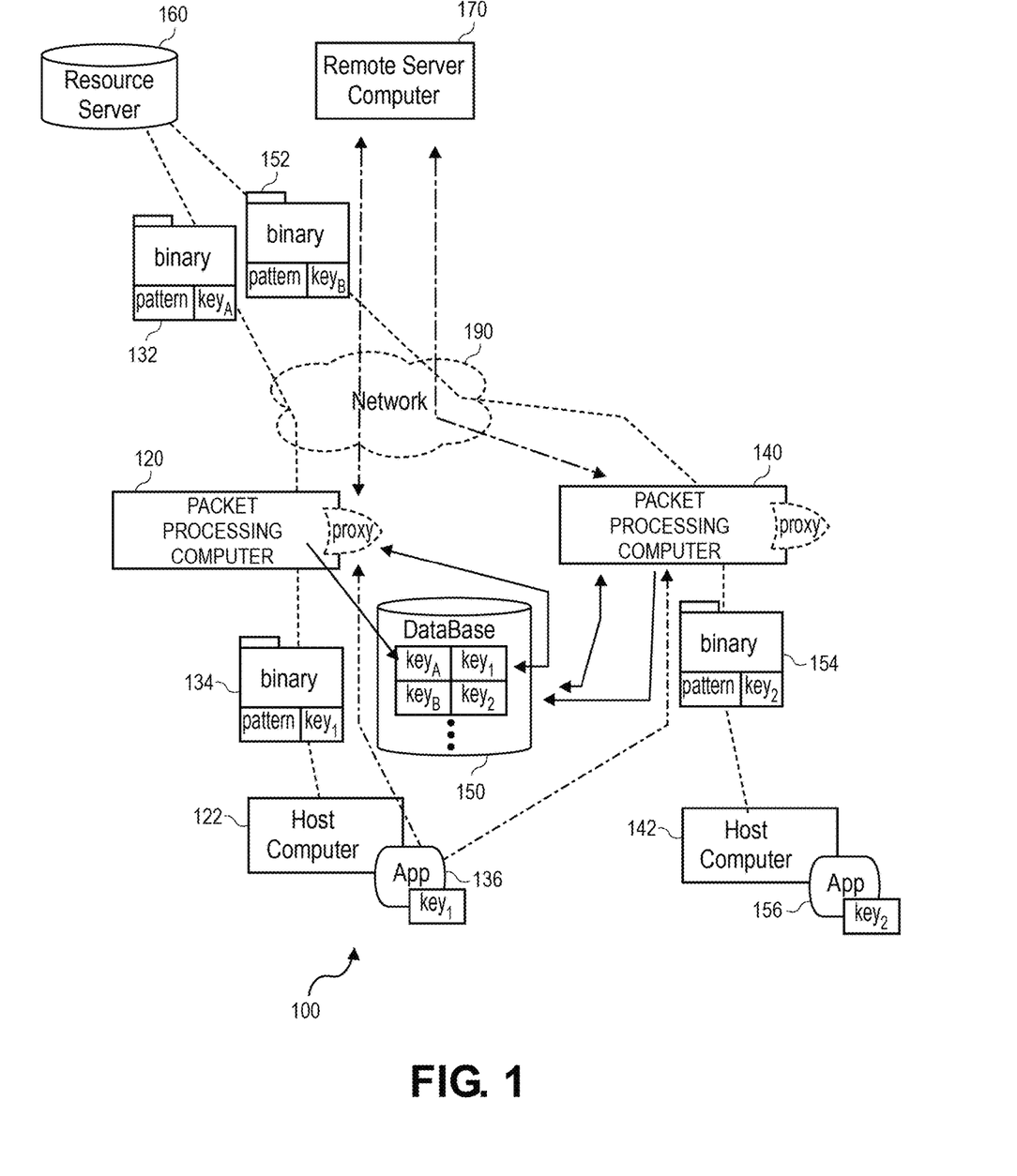
FIG. 1 is a schematic diagram of an implementation of a system for inspecting encrypted network communications, according to various embodiments.
Figure 2:
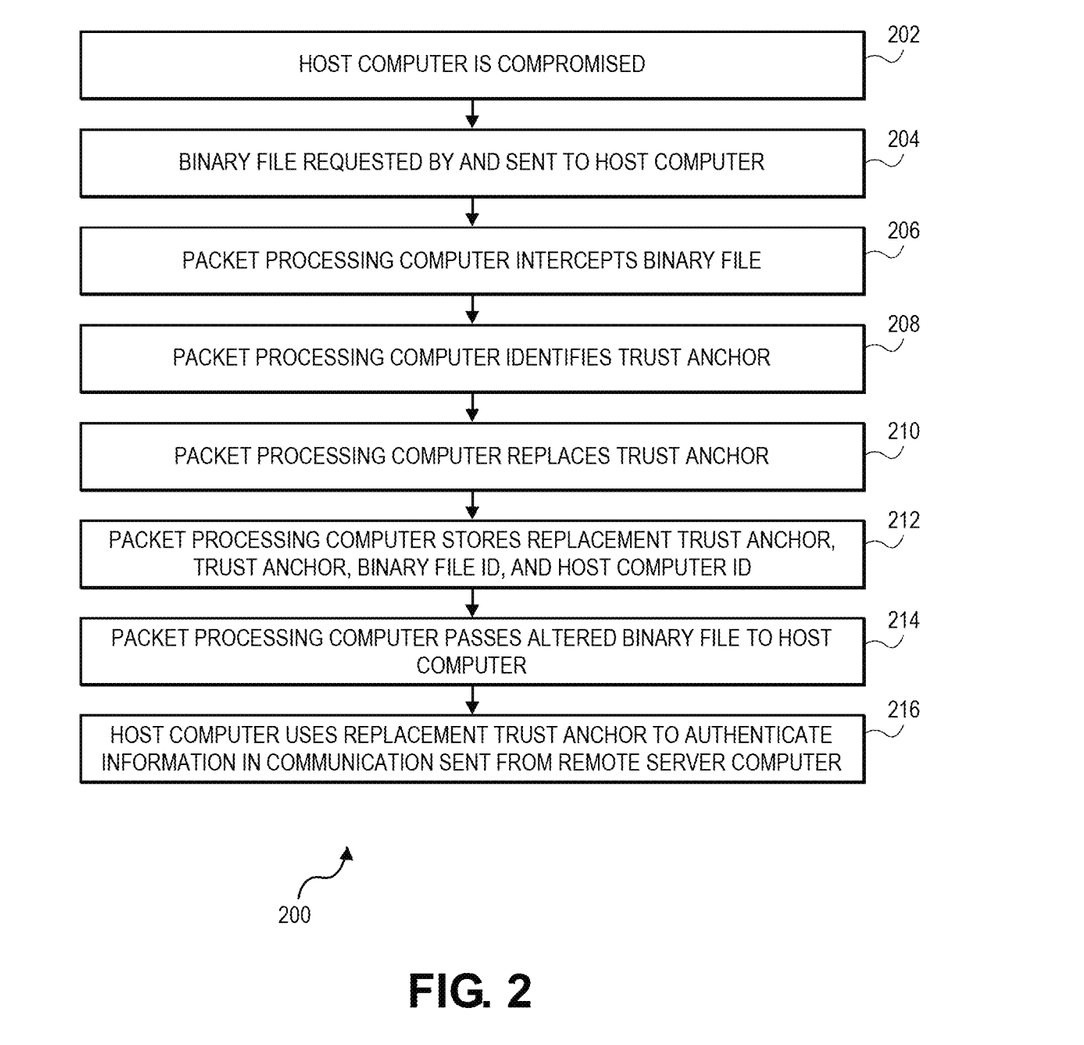
FIG. 2 is a flow chart for a method of inspecting encrypted network communications, according to various embodiments.

FIG. 1 is a schematic diagram of an implementation of a system 100 for inspecting encrypted network communications, according to various embodiments. This example of a system 100 for inspecting encrypted network communications includes a first packet processing computer 120 and an optional second packet processing computer 140. The two packet processing computers 120, 140 shown in FIG. 2 are by non-limiting example; fewer or more packet processing computers or devices may be included in various embodiments. The system 100 for inspecting encrypted network communications also includes a database 150. The database is communicatively coupled to the first packet processing computer 120 and the second packet processing computer 140, e.g., by being integrated with the first packet processing computer 120 or the second packet processing computer 140, or through a network 190, such as the internet, a local area network, etc. According to some embodiments, the database 150 is a distributed database, with multiple copies being present in various different physical locations.

The first packet processing computer 120, the second packet processing computer 140, and the database 150 of the system 100 for inspecting encrypted network communications are implemented in a context that is described presently for the example shown in FIG. 1. The system 100 for inspecting encrypted network communications is implemented in the context of at least a first host computer 122, and possibly one or more additional host computers, such as the second host computer 142 shown in FIG. 1. The first host computer 122 and the second host computer 142 are communicatively coupled to at least the first packet processing computer 120 and the second packet processing computer 140, respectively. According to some embodiments, these communicative couplings may be through a network 190, such as the internet. According to some embodiments, these communicative couplings may be through an intranet, e.g., in a corporate enterprise intranet or local area network (LAN). According to some embodiments, these communicative couplings may be achieved by co-location, e.g., by integrating the first packet processing computer 120 and the second packet processing computer 140 into the first host computer 122 and the second host computer 142, respectively. The context of the system 100 for inspecting encrypted network communications also includes a remote server computer 170, which is remote, for example, in the sense that it may be physically distanced from, but is communicatively coupled to, the first host computer 122 and the second host computer 142 through a network 190, such as the internet. In various examples described herein, the remote server computer 170 may be malicious, suspect, or untrusted; for example, it may be controlled by hackers, attackers, or other malicious actors. The context of the system 100 for inspecting encrypted network communications further includes a resource server 160, which is communicatively coupled to the first host computer 122 and the second host computer 142 through a network 190, such as the internet. In various examples described herein, the resource server 160 also may be malicious, suspect, or untrusted; for example, it also may be controlled by hackers or other malicious actors. According to some implementations, the resource server 160 and the remote server computer 170 are co-located, e.g., in the same intranet or integrated into the same computer.

A non-limiting example of an operational context of the system 100 for inspecting encrypted network communications is described presently.

One or both of the first host computer 122 and/or the second host computer 142 may be compromised by the initial exploit of a staged attack, by way of non-limiting example. For example, the first host computer 122 and/or the second host computer 142 may be compromised by an attacker that utilizes a stager exploit or loader exploit, by way of non-limiting examples. The initial exploit or stage may be implemented by way of any of a variety of attacks, such as a zero-day exploit, a phishing attack, or an attack that leverages any other vulnerability, which may be technical and/or social. The initial exploit is typically performed using very small and efficient software code (e.g., malware) that is maliciously implanted or loaded onto the first host computer 122 and/or the second host computer 142 and subsequently executes.

The initial exploit causes the exploited host computers 122, 142 to attempt to obtain the second stage of the staged attack. For example, the malicious software/code of the initial exploit may cause the host computers 122, 142 to reach out to the resource server 160, which is controlled by the attacker of the attacker's associates, to request and download the second stage (e.g., malicious software/code, such as malware) of the staged attack. As another example, the initial exploit may cause the host computers 122, 142 to be receptive of the second stage of the staged attack sent directly or broadcast from the resource server 160. The second stage of the staged attack may include an executable, which may be in the form of an implant or post-exploitation framework, by way of non-limiting examples. As shown in FIG. 1, the first host computer 122 may attempt to obtain the second stage from the resource server 160 as the binary file 132, and the second host computer 142 may attempt to obtain the second stage from the resource server 160 as the binary file 152.

The binary files 132, 152 include respective trust anchors. Thus, the trust anchors are sent over the network from the malicious resource server 160 to the host computers 122, 142. In general, a trust anchor may include data that a first computer may use to cryptographically authenticate a second computer, cryptographically validate a second computer, and/or encrypt/decrypt communications with a second computer, where the first computer is, e.g., the first host computer 122 and/or the second host computer 142, and where the second computer is, e.g., the remote server computer 170.

The trust anchors may be in the form of digital certificates, public keys, or key material for obtaining or deriving cryptographic keys, by way of non-limiting examples. Again by way of non-limiting example, FIG. 1 depicts that the binary file 132 includes a trust anchor that may be in the form of a public key of an asymmetric cryptographic key pair, denoted in FIG. 1 as "$key_A$," which may include, be associated with, or be identifiable by a binary numeric pattern. Further, the binary file 152 includes a trust anchor that may be in the form of public key of an asymmetric cryptographic key pair, denoted in FIG. 1 as "$key_B$," which may include, be associated with, or be identifiable by a binary numeric pattern. Note that according to various embodiments, $key_B$ may be the same as, or different from, $key_A$, and the respective patterns in the binary files may be identical or different. As described in detail herein, the intent of the attacker is that the respective host computers 122, 142 use these trust anchors to authorize, validate, and/or encrypt communications with the malicious remote server computer 170, which commands and controls the execution of the second stage of the staged attack.

As a first non-limiting example regarding the use of $key_A$ as a trust anchor, the attacker may intend that the remote server computer 170 uses its private key that corresponds to its public $key_A$ in an asymmetric cryptographic scheme to form a digital signature on a communication that it sends to the first host computer 122. For the attacker to be successful, the first host computer 122 (e.g., executing the malicious software from the binary file 132) would receive the communication and use $key_A$ to verify the digital signature, thus authenticating that the communication originated from the remote server computer 170. This is an example of a cryptographic trust chain with two links, with the trust anchor forming one link at the end of the trust chain. According to some embodiments, there may be intermediate keys and signatures, which establish cryptographic trust chains with more than two links.

As a second non-limiting example regarding the use of $key_A$ as a trust anchor, the attacker may intend that the remote server computer 170 and the first host computer 122 establish an encrypted communication channel. For the attacker to be successful, the first host computer 122 (e.g., executing the malicious software from the binary file 132) would generate a random number to be used as a key in a symmetric cryptographic scheme, and use $key_A$ to encrypt it according to the asymmetric cryptographic scheme of which $key_A$ is a part. The first host computer 122 would send the encrypted symmetric key to the remote server computer 170, which would use its private key that corresponds to its public $key_A$ in the asymmetric cryptographic scheme to decrypt the encrypted symmetric key that it receives. Subsequently, the first host computer 122 and the remote server computer 170 would use the shared symmetric key to encrypt and decrypt communications between them, thus establishing an encrypted communication channel.

Note that although non-limiting embodiments are expressly described herein in which the first host computer 122 and/or the second host computer 142 is compromised by an attacker, embodiments are no so limited. For example, a user may intentionally download and install any software that carries its own trust chain.

This concludes the description of a typical example of the operational context of the system 100 for inspecting encrypted network communications. Other context examples are possible.

An embodiment may thwart the attacker's intended use of a trust anchor by intercepting and replacing the attacker's trust anchor "in flight," so that a user of the embodiment may break and inspect the attacker's communications, without the attacker being aware that anything has been changed. This disclosure proceeds to provide a description of non-limiting example operations of the first packet processing computer 120, the second packet processing computer 140, and the database 150 of the system 100 for inspecting encrypted network communications, further in reference to FIG. 1.

Solely for purposes of illustration and clarity, the following conventions are used for line styles in FIG. 1. Communication paths between the host computers 122, 142 and the resource server 160 are indicated by dash-dash lines. Communication paths between the host computers 122, 142 and the remote server computer 170 are indicated by dash-dot-dash lines. Communications between the packet processing computers 120, 140 and the database 150 are indicated by solid lines, with storage operations indicated by solid lines with white arrowheads.

When the first host 122 requests the binary file 132 from the resource server 160, the first packet processing computer 120 may intercept, receive, or otherwise obtain the communication (e.g., the binary file 132). The first packet processing computer 120 may proceed to identify, e.g., using an associated pattern, and replace the trust anchor in the binary file 132 with a replacement trust anchor, so as to create an altered binary file 134, which it sends to the first host computer 122 in place of the original binary file 132. The process summarized in this paragraph is detailed presently.

The first packet processing computer 120 may identify the trust anchor (e.g., $key_A$) in the binary stream that contains the binary file 132 using any of a variety of techniques.

According to a first identification technique, the first packet processing computer 120 may identify the trust anchor in the binary file 132 based on a prior analysis of a previous instance of the binary file 132. For example, a computer security and analytics organization may analyze and classify various malware software, and it may analyze and parse the contents of the binary file 132 to identify the trust anchor. According to the first identification technique, the first packet processing computer 120 may use this predetermined information, which may include a pattern that is associated with, or a location of, the trust anchor to analyze and parse the contents of the binary file 132, so as to identify and extract the trust anchor. For example, the trust anchor may be stored in association with a known pattern within all instances of the binary file 132, and the first packet processing computer 120 may therefore identify the data that is associated with such a known pattern as being a trust anchor. As another example, the trust anchor may be stored in a known part of all instances of the binary file 132, and the first packet processing computer 120 may therefore identify the data in that known part as being a trust anchor.

According to a second identification technique, the first packet processing computer 120 may find or identify the trust anchor (e.g., $key_A$) in the binary stream that contains the binary file 132 by identifying a pattern that forms a container data structure for the trust anchor. In general, various container structures with known patterns (e.g., formats) may be used to store various trust anchors. Non-limiting examples of such container structures follow. Privacy Enhanced Mail (PEM) may encode and structure various trust anchors (by way of non-limiting example, X.509 certificates or asymmetric public keys) by encoding them in a Base64-encoded ASCII file, which may contain multiple certificates and keys, and which may have extensions such as .pem, .crt, .cer, and .key. PEM files, for example, are known to contain their trust anchor(s) within a section, portion, or container indicated by "-----BEGIN CERTIFICATE-----" and "-----END CERTIFICATE-----" delimiters. Public-Key Cryptography Standards (PKCS) may containerize, encode, and/or structure various trust anchors. PKCS #12 is a binary file format that can typically contain server certificates, intermediate certificates, and private keys. PKCS #12 files typically have a .pfx or .p12 extension. PKCS #7 is a Base64-encoded ASCII file format that can typically contain server and intermediate certificates. PKCS #7 files typically have a .p7b or .p7c extension. PKCS #8 is a format that describes syntax for private-key information. Thus, according to some embodiments, the first packet processing computer 120 may identify the trust anchor in the binary stream that contains the binary file 132 by recognizing patterns such as known, well-defined encoding characteristics, file types, intra-file locations, data structures, or the like that are used as containers for various trust anchors.

Identification of the trust anchor in the binary stream that contains the binary file 132 is not limited to the above example techniques. For example, some embodiments may utilize a trained machine learning subsystem to identify the trust anchor. Other techniques, such as various algorithmic techniques, are also contemplated.

Once the first packet processing computer 120 identifies the trust anchor (e.g., $key_A$), it proceeds to replace it in the binary file 132 with a replacement trust anchor so as to form an altered binary file 134. The replacement of the trust anchor by the first packet processing computer 120 may take any of a variety of forms. According to some embodiments, the replacement trust anchor may be a different public key, denoted "key$_1$" in the altered binary file 134, of the same or different asymmetric cryptographic scheme. According to such embodiments, the first packet processing computer 120 may store a copy of the corresponding private key locally and/or at the database 150. According to some embodiments, both the public key and the binary numeric pattern may be replaced.

In various embodiments, the first packet processing computer 120 stores its replacement trust anchor in association with (e.g., in the same row of respective database table columns) the original trust anchor in the database 150. The first packet processing computer 120 may store the trust anchors in association with an identifier of the binary file 132 (e.g., a hash thereof) and/or an identifier of the first host computer 122 (e.g., an IP address).

The first packet processing computer 120 passes, transmits, or otherwise provides the altered binary file 134 to the first host computer 122. The first host computer 122 thus receives the binary data payload (e.g., malicious code or malware) along with the replacement trust anchor (e.g., key$_1$) instead of the original trust anchor (e.g., key$_A$).

When the first host computer 122 executes the altered binary file 134, the malicious app 136 that the altered binary file 134 installs in the first host computer 122 attempts to communicate with the malicious remote server computer 170, e.g., to receive command and control instructions, to authenticate the altered binary file 134, and/or to establish an encrypted communication channel, among other things. These communications may pass through the first packet processing computer 120, which can access both the original trust anchor and the replacement trust anchor stored in the database 150. In the embodiment shown, the first packet processing computer 120 starts a proxy service, which may establish a communication channel with the app 136 executing on the first host computer 122 using the replacement trust anchor (e.g., key$_1$), by way of non-limiting example, by using the replacement trust anchor to establish and encrypt communications using a symmetric cryptographic key shared between the proxy service and the app 136. The first packet processing computer 120 may store a copy of such a symmetric cryptographic key at the database 150 in association with the other data stored in association with the trust anchor and the replacement trust anchor. The malicious app 136 executing on the first host computer 122 trusts the proxy service because it is cryptographically linked to the replacement trust anchor.

Optionally substantially simultaneously, the proxy service establishes a communication session with the remote server computer 170 using the original trust anchor (e.g., key$_A$) that was copied from the binary file 132. In the case of client validation/authentication, for example, the malicious remote server computer 170 trusts the proxy service because it uses the trust anchor that was supplied by the malicious resource server 160, copied out, and previously stored. Additionally, any pre-shared symmetric keys that were replaced, or are passed/established (e.g., mutually generated) during the communication session (and stored in the database 150), are used to maintain bi-directional encrypted communications between the proxy service and the remote server computer 170, with plain text accessible within the first packet processing computer 120. The first packet processing computer 120 may store copies of any such symmetric cryptographic keys at the database 150 in association with the other data stored in association with the trust anchor and the replacement trust anchor.

According to some embodiments, the first packet processing computer 120 uses the original trust anchor to establish/validate a first trust chain and/or encrypt communications with the malicious remote server computer 170, and uses the replacement trust anchor to establish/validate a second trust chain and/or encrypt communications with the malicious app 136 executing on the first host computer 122. Thus, regardless as to whether a communication originates from the app 136 executing on the first host computer 122 or from the remote server computer 170, the first packet processing computer 120 can validate and authenticate any communication intended to be sent between these computers. Further, regardless as to whether an encrypted communication originates from the app 136 executing on the first host computer 122 or from the remote server computer 170, the first packet processing computer 120 can decrypt any encrypted communications sent between these computers.

According to some embodiments, multiple packet processing computers may operate in the system 100. A description of non-limiting example operations of the second packet processing computer 140, which it may perform prior to, subsequent to, or in parallel with the actions described above, follows.

Similar to description above with respect to the first packet processing computer 120, the second packet processing computer 140 may be compromised by malicious, suspect, or untrusted code such that it reaches out to obtain malicious software, for example. The second host computer 142 (e.g., the malicious code) may attempt to obtain a second stage exploit (e.g., malware) from the malicious resource server 160 in the form of the binary file 152. Similar to the above description with respect to the first host computer 122 and the first packet processing computer 120, the second packet processing computer 140 identifies and replaces the trust anchor (e.g., key$_B$) in the binary file 152 with a replacement trust anchor (e.g., key$_2$), so as to create an altered binary file 154, which it sends to the second host computer 142 in place of the original binary file 152. In various embodiments, the second packet processing computer 140 stores the original trust anchor (by way of non-limiting example, key$_B$) in association with the replacement trust anchor (by way of non-limiting example, key$_2$), an identifier of the binary file 152 (e.g., a hash thereof) and an identifier of the second host computer 142 (e.g., an IP address) in the database 150. Subsequently, when the malicious app 156 installed by the altered binary file 154 and executing on the second host computer 142 communicates with the malicious remote server computer 170, the second packet processing computer 140 may intercept and decrypt any such communications. In various embodiments, the identifier of the binary file and/or the identifier of the second host computer may be used as indexes to lookup the original and/or replacement trust anchors when the packet processing computer 120, 140 intercepts and processes a communication to/from the remote server computer 170 and the host computer 122, 142.

Alternately, or in addition to the scenario described immediately above, the original trust anchor of the binary file 152 may be identical to that of the original trust anchor in the binary file 132 (e.g., key$_A$). In such a case, the second packet processing computer 140 may retrieve and use the same replacement trust anchor (e.g., key$_1$) as was inserted into the altered binary file 134 by the first packet processing computer 120 by retrieving it from the database 150 when it generates the altered binary file 154.

In the example shown in FIG. 1, note that the app 136 executing on the first host computer 122 may communicate with the remote server computer 170 via a network route through the second packet processing computer 140, as opposed to through the first packet processing computer 120. Nevertheless, because the second packet processing computer 140 can communicate with the database 150, it can retrieve the respective original and substitute trust anchor, as well as any symmetric keys, and authenticate/validate/decrypt any communications sent between the app 136 and the remote server computer 170, e.g., in a manner similar to that described above with respect to the first packet processing computer 120.

FIG. 2 is a flow chart for a method 200 of inspecting encrypted network communications, according to various embodiments. By way of non-limiting example, the method 200 may be implemented by the system 100 for inspecting encrypted network communications, as shown and described herein in reference to FIG. 1. in various embodiments, the system may include one or more packet processing computers that implement certain operations of the method 200, such as the first packet processing computer 120 and/or the second packet processing computer 140, and a database, such as the database 150, as shown and described herein in reference to FIG. 1. The method 200 may be implemented in a system and operational context as shown and described in reference to FIG. 1, by way of non-limiting example.

At 202, the method 200 includes that a host computer (e.g., 122, 142) is compromised. The operation or actions of 202 may have occurred prior to the involvement of the system for inspecting encrypted network communications. The malicious compromise of the host computer may be as described herein in reference to FIG. 1, e.g., it may have been performed using a initial exploit of a staged attack, such as a stager exploit or loader exploit. Note that the actions of 202 are optional. For example, some embodiments may be used for a binary file (e.g., 132, 152) that is intentionally downloaded by a person or automated process, where the binary file (e.g., 132, 152) is benign.

At 204, the method 200 includes that a binary file (e.g., 132, 152) is initiated by and sent to the compromised host computer, e.g., from a resource server, such as the malicious resource server 160 as shown and described herein in reference to FIG. 1. The binary file may be sent at the request of the host computer, or at the initiative of the resource server. The binary file is configured to facilitate communications between the host computer and a remote server computer (e.g., 170). By way of non-limiting example, the binary file may include a malware executable that is part of the second stage of a staged attack. (Note that embodiments are not limited to malicious software; the binary file may be benign according to various embodiments.) The binary file may be included in a binary stream sent over the network, and the binary stream may include a trust anchor (e.g., $key_A$, $key_B$). The trust anchor may be included in the binary file itself, or be included in the binary stream and associated with the binary file. The trust anchor is configured to authenticate the remote server computer, e.g., by being used to establish a cryptographic trust chain, as shown and described herein in reference to FIG. 1.

At 206, the method 200 includes intercepting, receiving, or obtaining, by a packet processing computer (e.g., 120, 140), the binary file. The packet processing computer may intercept the binary file at the resource server, at the host computer, or at any point on the network between the resource server and the host computer.

At 208, the method 200 includes identifying, by the packet processing computer (e.g., 120, 140), the trust anchor in a binary stream that contains the binary file (e.g., 132, 152). The identification may utilize any of a variety of techniques, including, but not limited to, identifying or recognizing the trust anchor based on a prior analysis of an instance of the binary file, or identifying or recognizing a container data structure for the trust anchor. The trust anchor may be identified in the binary file (e.g., 132, 152).

At 210 the method 200 includes the packet processing computer replacing the trust anchor (e.g., $key_A$, $key_B$) in the binary file with a replacement trust anchor (e.g., $key_1$, $key_2$). The actions of 210 may be performed as shown and described herein in reference to FIG. 1 and may produce an altered binary file (e.g., 134, 154).

At 212, the method 200 includes storing the original trust anchor in association with one or more of: the replacement trust anchor, an identifier of the binary file, and/or an identifier of the host computer. Other data may also be stored in association with the aforementioned data. These data may be stored at a storage location that is communicatively accessible by the packet processing computer, such as a distributed database, e.g., the database 150 shown and described herein in reference to FIG. 1.

At 214, the method 200 includes passing, transmitting, or otherwise communicating, by the packet processing computer, the altered binary file (e.g., 134, 154) to the host computer. According to the actions of 214, the altered binary file is received by the host computer instead of the original binary file (e.g., 132, 152) that was provided by the resource server.

At 216, the method 200 includes the host computer (e.g., a malicious app 136, 156 running on a host computer 122,142) using the replacement trust anchor to authenticate the information in communications sent from the malicious remote server computer (e.g., 170). For example, an original communication as sent by the remote server computer may have included information that is authenticatable by the trust anchor, and the original communication may have been intercepted and possibly altered by the packet processing computer (e.g., 120, 140) prior to being received by the host computer. An example of such an alteration includes the packet processing computer (e.g., 120, 140) replacing an original digital signature (that is authenticatable by the original trust anchor, e.g., $key_B$) with a digital signature that is authenticatable by the replacement trust anchor (e.g., $key_2$). Another example of such an alteration includes the packet processing computer decrypting information in the original communication using a cryptographic key and then re-encrypting it using a different, replacement cryptographic key. These examples are described in further detail below.

Any of a variety of actions may follow or be included with the method 200 as shown and described in reference to FIG. 2. For example, the remote server computer (e.g., 170) may send a communication to the host computer (e.g., 122, 142), where the communication includes a digital signature that is configured to be authenticated using the trust anchor (e.g., $key_A$, $key_B$). A packet processing computer, e.g., the packet processing computer (e.g., 120, 140) described in reference to the method 200 or a different packet processing computer, may intercept the communication and replace the digital signature with a replacement digital signature, to produce an altered communication, where the replacement digital signature is configured to be authenticated by the replacement trust anchor (e.g., $key_1$, $key_2$) described in reference to 210. The packet processing computer described in this paragraph may then pass the altered communication to the host computer, such that the altered communication is received by the host computer instead of the communication as originally sent by the remote server computer. The host computer (e.g., a malicious app 136, 156 running on a host computer 122, 142) may then authenticate the replacement digital signature using the replacement trust anchor that it received at 214 per the method 200.

Another example of actions that may follow or be included with the method 200 as shown and described in reference to FIG. 2 is set forth presently. A packet processing computer, e.g., the packet processing computer 120, 140 described in reference to the method 200 or a different packet processing computer, may set up an encrypted communication channel with the remote server computer (e.g., 170) using the trust anchor (e.g., by using the trust anchor (e.g., $key_A$, $key_B$) to establish a cryptographic symmetric key that is shared between the packet processing computer of this paragraph and the remote server computer) and may set up another encrypted communication channel with the host computer (e.g., 122, 142) using the replacement trust anchor (e.g., by using the replacement trust anchor (e.g., $key_1$, $key_2$) to establish a second cryptographic symmetric key that is shared between the packet processing computer of this paragraph and the host computer). The packet processing computer described in this paragraph may transfer a communication between the remote server computer and the host computer through the first encrypted communication channel and through the second encrypted communication channel. The communication may include encrypted information, and the packet processing computer described in this paragraph may intercept and decrypt the encrypted information as it is in transit between the remote server computer and the host computer.

Note that although some embodiments are shown and described herein in reference to a staged malware attack, embodiments are not so limited. In general, embodiments may be used by a variety of entities and for a variety of purposes, such as, by way of non-limiting examples: entities that implement firewalls, large enterprise systems, telecommunications providers, computer security applications, etc. For example, the binary executable described herein may be downloaded upon request by a user or automated system and may be benign.

Certain examples can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), flash memory, and magnetic or optical disks or tapes.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented using computer readable program instructions that are executed by an electronic processor.

These computer readable program instructions may be provided to a processor of a general-purpose computer, special purpose computer, or other programmable data processing apparatus to produce a machine, such that the instructions, which execute via the electronic processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on a user's computer, partly on the user's computer, as a stand-alone software package, partly on the user's computer and partly on a remote computer or entirely on the remote computer or server.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112 (f). However, for any claims containing elements designated in any other manner, it is intended that such elements are not to be interpreted under 35 U.S.C. § 112 (f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of inspecting encrypted network communications, the method comprising:
   intercepting, by a packet processing computer, a binary file sent from a resource server to a host computer, wherein the binary file is malicious, and wherein the binary file is configured to facilitate communications between the host computer and a remote server computer;
   identifying, by the packet processing computer, a trust anchor in a binary stream that contains the binary file, wherein the trust anchor is configured to authenticate the remote server computer;
   replacing, by the packet processing computer, the trust anchor in the binary file with a replacement trust anchor, whereby an altered binary file is produced;
   storing the trust anchor in association with the replacement trust anchor, an identifier of the binary file, and an identifier of the host computer, wherein the storing is at a storage location that is communicatively accessible by the packet processing computer; and
   passing, by the packet processing computer, the altered binary file to the host computer, wherein the altered binary file is received by the host computer instead of the binary file, and wherein the replacement trust anchor is usable by the host computer to authenticate information in a communication sent by the remote server computer.

2. The method of claim 1, wherein the binary file comprises malware, and wherein the binary file is requested from the resource server by the host computer after the host computer is compromised.

3. The method of claim 1, wherein the packet processing computer is on a network path between the host computer and the resource server.

4. The method of claim 1, wherein the trust anchor is at one end of a cryptographic trust chain, wherein another end of the cryptographic trust chain comprises a public key of the remote server computer in an asymmetric cryptographic scheme.

5. The method of claim 1, wherein the identifying comprises identifying based on a prior analysis of an instance of the binary file.

6. The method of claim 1, wherein the identifying comprises identifying a container data structure for the trust anchor.

7. The method of claim 1, further comprising:
   intercepting, by a second packet processing computer, a communication from the remote server computer to the host computer, wherein the communication comprises a digital signature that is configured to be authenticated using the trust anchor;
   replacing, by the second packet processing computer, the digital signature by a replacement digital signature, whereby an altered communication is produced, wherein the replacement digital signature is configured to be authenticated by the replacement trust anchor; and
   passing, by the second packet processing computer, the altered communication to the host computer, wherein the altered communication is received by the host computer instead of the communication, and wherein the replacement trust anchor is usable by the host computer to authenticate the replacement digital signature.

8. The method of claim 1, further comprising:
   establishing, by a second packet processing computer, a first encrypted communication channel with the remote server computer using the trust anchor;
   establishing, by the second packet processing computer, a second encrypted communication channel with the host computer using the replacement trust anchor; and
   transferring, by the second packet processing computer, a communication between the remote server computer and the host computer through the first encrypted communication channel and through the second encrypted communication channel.

9. The method of claim 8, wherein the communication comprises encrypted information, the method further comprising decrypting, by the second packet processing computer, the encrypted information.

10. The method of claim 8,
    wherein the establishing the first encrypted communication channel comprises establishing a first cryptographic symmetric key, wherein the first cryptographic symmetric key is shared between the second packet processing computer and the remote server computer using the trust anchor, and
    wherein the establishing the second encrypted communication channel comprises establishing a second cryptographic symmetric key, wherein the second cryptographic symmetric key is shared between the second packet processing computer and the host computer using the replacement trust anchor.

11. A system for inspecting encrypted network communications, the system comprising: a non-transitory computer readable medium comprising instructions; and at least one electronic processor that executes the instructions to perform operations comprising:
    intercepting, by a packet processing computer, a binary file sent from a resource server to a host computer, wherein the binary file is malicious, and wherein the binary file is configured to facilitate communications between the host computer and a remote server computer;
    identifying, by the packet processing computer, a trust anchor in a binary stream that contains the binary file, wherein the trust anchor is configured to authenticate the remote server computer;
    replacing, by the packet processing computer, the trust anchor in the binary file with a replacement trust anchor, whereby an altered binary file is produced;
    storing the trust anchor in association with the replacement trust anchor, an identifier of the binary file, and an identifier of the host computer, wherein the storing is at a storage location that is communicatively accessible by the packet processing computer; and
    passing, by the packet processing computer, the altered binary file to the host computer, wherein the altered binary file is received by the host computer instead of the binary file, and wherein the replacement trust anchor is usable by the host computer to authenticate information in a communication sent by the remote server computer.

12. The system of claim 11, wherein the binary file comprises malware, and wherein the binary file is requested from the resource server by the host computer after the host computer is compromised.

13. The system of claim 11, wherein the packet processing computer is on a network path between the host computer and the resource server.

14. The system of claim 11, wherein the trust anchor is at one end of a cryptographic trust chain, wherein another end of the cryptographic trust chain comprises a public key of the remote server computer in an asymmetric cryptographic scheme.

15. The system of claim 11, wherein the identifying comprises identifying based on a prior analysis of an instance of the binary file.

16. The system of claim 11, wherein the identifying comprises identifying a container data structure for the trust anchor.

17. The system of claim 11, wherein the operations further comprise:
- intercepting, by a second packet processing computer, a communication from the remote server computer to the host computer, wherein the communication comprises a digital signature that is configured to be authenticated using the trust anchor;
- replacing, by the second packet processing computer, the digital signature by a replacement digital signature, whereby an altered communication is produced, wherein the replacement digital signature is configured to be authenticated by the replacement trust anchor; and
- passing, by the second packet processing computer, the altered communication to the host computer, wherein the altered communication is received by the host computer instead of the communication, and wherein the replacement trust anchor is usable by the host computer to authenticate the replacement digital signature.

18. The system of claim 11, wherein the operations further comprise:
- establishing, by a second packet processing computer, a first encrypted communication channel with the remote server computer using the trust anchor;
- establishing, by the second packet processing computer, a second encrypted communication channel with the host computer using the replacement trust anchor; and
- transferring, by the second packet processing computer, a communication between the remote server computer and the host computer through the first encrypted communication channel and through the second encrypted communication channel.

19. The system of claim 18, wherein the communication comprises encrypted information, wherein the operations further comprise decrypting, by the second packet processing computer, the encrypted information.

20. The system of claim 18,
- wherein the establishing the first encrypted communication channel comprises establishing a first cryptographic symmetric key, wherein the first cryptographic symmetric key is shared between the second packet processing computer and the remote server computer using the trust anchor, and
- wherein the establishing the second encrypted communication channel comprises establishing a second cryptographic symmetric key, wherein the second cryptographic symmetric key is shared between the second packet processing computer and the host computer using the replacement trust anchor.

* * * * *